US007188482B2

(12) United States Patent
Sadegh et al.

(10) Patent No.: US 7,188,482 B2
(45) Date of Patent: Mar. 13, 2007

(54) FAULT DIAGNOSTICS AND PROGNOSTICS BASED ON DISTANCE FAULT CLASSIFIERS

(75) Inventors: Payman Sadegh, Manchester, CT (US); Mohsen Farzad, Glastonbury, CT (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 11/192,595

(22) Filed: Jul. 29, 2005

(65) Prior Publication Data

US 2006/0042277 A1    Mar. 2, 2006

Related U.S. Application Data

(60) Provisional application No. 60/635,523, filed on Dec. 13, 2004, provisional application No. 60/605,080, filed on Aug. 27, 2004.

(51) Int. Cl.
*F25B 49/00* (2006.01)
*G01K 13/00* (2006.01)
*G06F 11/30* (2006.01)
*G21C 17/00* (2006.01)

(52) U.S. Cl. ............................ 62/126; 62/127; 62/129; 165/11.1; 236/94; 702/185

(58) Field of Classification Search .................. 62/125, 62/126, 127, 129, 130, 131; 165/11.1, 11.2; 236/94; 702/183, 184, 185
See application file for complete search history.

(56) References Cited

U.S. PATENT DOCUMENTS

| | | | | |
|---|---|---|---|---|
| 5,860,285 | A | * | 1/1999 | Tulpule ........................ 62/127 |
| 6,460,354 | B2 | * | 10/2002 | Yabuki et al. ................. 62/129 |
| 6,658,373 | B2 | * | 12/2003 | Rossi et al. .................... 62/125 |
| 6,758,051 | B2 | * | 7/2004 | Jayanth et al. ................ 62/126 |
| 2003/0139908 | A1 | * | 7/2003 | Wegerich et al. ........... 702/183 |

OTHER PUBLICATIONS

International Search Report, dated Mar. 15, 2006.

* cited by examiner

*Primary Examiner*—Marc Norman
(74) *Attorney, Agent, or Firm*—Carlson, Gaskey, & Olds

(57) ABSTRACT

The present invention is directed to a mathematical approach to detect faults by reconciling known data driven techniques with a physical understanding of the HVAC system and providing a direct linkage between model parameters and physical system quantities to arrive at classification rules that are easy to interpret, calibrate and implement. The fault modes of interest are low system refrigerant charge and air filter plugging. System data from standard sensors is analyzed under no-fault and full-fault conditions. The data is screened to uncover patterns though which the faults of interest manifest in sensor data and the patterns are analyzed and combined with available physical system information to develop an underlying principle that links failures to measured sensor responses. These principles are then translated into online algorithms for failure detection.

20 Claims, 7 Drawing Sheets

FAULT DIAGNOSTICS AND PROGNOSTICS BASED ON DISTANCE FAULT CLASSIFIERS

This application claims priority to U.S. Provisional Application No. 60/605,080 which was filed on Aug. 27, 2004 and U.S. Provisional Application No. 60/635,523 which was filed on Dec. 13, 2004.

BACKGROUND OF THE INVENTION

The present invention relates to heating, ventilation and cooling (HVAC) systems, and more particularly to fault diagnostics associated with early detection and isolation of failures in HVAC systems.

HVAC systems often do not function as well as expected due to faults developed during routine operation. While these faults are indicative of a failure mode, many faults do not result in immediate system shut down or costly damages. However, most faults, if unnoticed for a long period of time, could adversely affect system performance, life, and life-cycle cost.

While diagnostics refer to detection and isolation of faults, prognostic typically refers to predicting faults before they occur. In many applications, however, early detection and diagnostics may serve the same end as prognostics. This is the case when failure propagation happens at a reasonably slow pace. Small changes in system parameters typically do not have a substantial adverse effect initially. As such, accurate prediction of the time between detection of a fault, that is, a small change to one or more system parameters, to full system deterioration or shutdown is not crucial. For instance, detection of HVAC system refrigerant charge leakage and air filter plugging are examples of failure modes for which early detection of changes provides adequate information to take timely maintenance action.

Approaches to diagnostics may be divided into two broad categories. One category deals with direct measurement of monitored quantities and another category combines sensing technologies with mathematical algorithms. The technical emphasis in these approaches is the development of dedicated sensors for measurement of crucial system parameters. While such approaches may be more accurate, they are typically costly as they involve adding dedicated hardware for each failure mode of interest. In the combined approach, algorithms play the major role since they allow inference about the health of the system from indirect measurements provided by the sensors. Because the addition of new sensors is more expensive and more difficult to manufacture, algorithms alone are incorporated to utilize available sensors that are configured for a control purpose.

Design of failure detection and diagnostics algorithms have been subject of extensive research ranging from statistical approaches and reviews to techniques derived from artificial intelligence and reasoning, graph theory, and bond graphs. Several diagnostics techniques have been applied to the problem of chiller and HVAC fault isolation. Among known approaches, "black-box" or data-driven techniques (such as neural networks) have received considerable attention. Such approaches are well suited to domains where data is abundant but physical knowledge about the phenomenon is scarce. However, one problem with such approaches is that recalibrating the parameters of the black-box model typically requires extensive re-experimentation even if the system changes slightly as there is no direct linkage between model parameters and physical system quantities.

As such, there is a desire for an analytical approach to detect faults which reconciles the results of known data driven techniques with a physical understanding of the HVAC system and provides a direct linkage between model parameters and physical system quantities to arrive at classification rules that are easy to interpret, calibrate and implement.

SUMMARY OF THE INVENTION

The present invention is directed to an analytical approach to detect faults by reconciling known data driven techniques with a physical understanding of the HVAC system and providing a direct linkage between model parameters and physical system quantities to arrive at classification rules that are easy to interpret, calibrate and implement.

The present invention focuses on two of the most common problems encountered a multi-modular split HVAC system, which are detecting low refrigerant conditions and air filter plugging. A method for refrigerant charge leak detection is disclosed that relies on a systematic technique for analysis of experimental data, extraction of fault signatures, formulation of fault detection principals, and development and implementation of diagnostic algorithms. A method of detecting air filter plugging is also disclosed that relies on reduced physics-based relationships in heat exchangers to estimate air mass flow through the heat exchangers.

Both methods incorporate data filtering techniques to determine which portions of data carry the most information regarding the underlying failure, variable sub-selection based upon available sensors, calculation of a distance between faulty and normal data sets, and maximization of this distance with respect to filtering parameters and variable sub-selection. The sub-selected variables are then processed by classification techniques to generate easy to interpret and easy to implement classification rules.

These and other features of the present invention can be best understood from the following specification and drawings, the following of which is a brief description.

DETAILED DESCRIPTION OF THE PREFERRED EMBODIMENT

Figure 1:
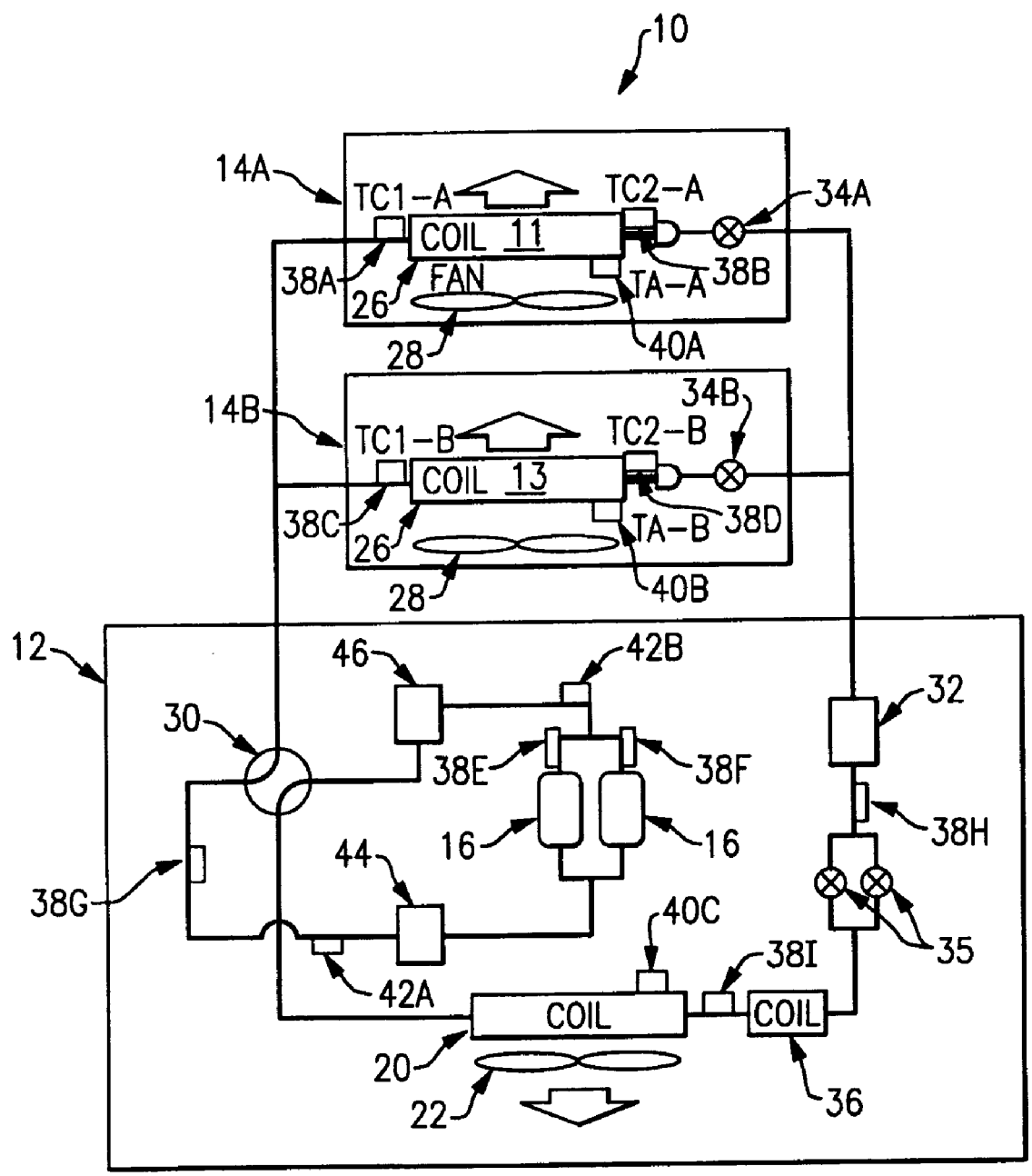
FIG. 1 is schematic illustration of an example HVAC system according to the present invention.

FIG. 1 is a schematic illustration of an example HVAC system 10 according to the present invention. In this example, the HVAC system 10 is a duct-free heat pump system known as a multi-modular split system (MMS). The MMS 10 includes one outdoor unit 12 and two indoor units 14A and 14B, which operate in a cooling mode to provide cool air to an interior space during a warm or hot season and a heating mode to provide warm air to the interior space during a cool or cold season.

The outdoor unit 12 includes a pair of parallel compressors 16, which are variable speed, an outdoor expansion valve 18 to control a sub-cool in the cooling mode and to control a superheat in the heating mode, an outdoor heat exchanger 20, which behaves as a condenser in the cooling mode and as an evaporator in the heating mode, and an outdoor fan 22.

Each of the two indoor units 14A and 14B includes an indoor expansion valve 24, to control the sub-cool in the cooling mode and superheat in the heating mode, and an indoor heat exchanger 26, which behaves as an evaporator in the cooling mode and as a condenser in the heating mode, and an indoor fan 28.

A 4-way valve 30 controls the mode of operation from the cooling mode to the heating mode and vice versa. The MMS 10 also includes a receiver tank 32 for storage of refrigerant charge that is operable to change the amount of refrigerant charge circulated depending on the conditions.

The speed of the compressors 16 and the indoor fan 28 are adjusted in response to a deviation between a room temperature and a set point. The speed of the compressors 16 is further adjusted to match the total cooling or heating demand.

Expansion valves are disposed throughout the MMS 10. In the illustrated example, the expansion valves are pulse modulated valves 34 that are actuated via pulse modulation. The pulse modulated valves 34 are controlled by an actuation signal that adjusts an opening of the pulse modulated valves 34 to control a flow of refrigerant through the MMS 10. Pulse modulated valves 34A and 34B are positioned in-line proximate to the indoor heat exchangers 26. A pair of pulse modulated valves 35 is positioned in-line between a coil 36 and the receiver tank 32.

Multiple sensors are also disposed throughout the MMS 10. In the illustrated example, the sensors include a plurality of refrigerant-side temperature sensors 38, air-side temperature sensors 40, and pressure sensors 42.

Refrigerant-side temperature sensors 38A–38D are positioned near each end of each of the indoor heat exchangers 26. Refrigerant-side temperature sensors 38E and 38F are positioned near one end of each of the compressors 16. Refrigerant-side temperature sensor 38G is positioned between the 4-way valve 30 and an accumulator 44. Refrigerant-side temperature sensor 38H is positioned between the pair of pulse modulated valves 35 and the receiver tank 34. Refrigerant-side sensor 38I is positioned between the outdoor heat exchanger 20 and the coil 36.

Air-side temperature sensors 40A and 40B are positioned between the indoor fans 28 and the indoor heat exchangers 26 and air-side temperature sensor 40C is positioned proximate to the outdoor fan 20.

Pressure sensor 42A is positioned proximate to the accumulator 44 and pressure sensor 42B is positioned between the compressors 16 and an oil separator 46.

The present invention focuses on developing algorithms to detect faults within the MMS 10 by utilizing existing system sensors and data. An analytical method of diagnosing at least one system fault utilizing existing system sensors is disclosed. The analytical method includes identifying sensors that are available within a given system, analyzing sensor data to determine which of the available sensors generate data indicative of a system fault based upon a maximum separation/minimum overlap between no-fault data and full-fault data for each available sensor, determining a fault relationship based on the analysis, comparing at least one measured system characteristic to the fault relationship and generating at least one fault code indicative of a failure mode when a system fault is identified. However, the system fault identified is not necessarily the system characteristic directly monitored by the sensor generating the data that is being analyzed. For example, the sensor may generate data associated with a pressure within the system, however, the failure code generated may be indicative of a low system refrigerant charge or an air filter plugging condition.

The following discusses the development of both a low system refrigerant charge indicator and an air filter plugging indicator of the present invention.

Development of a Low System Refrigerant Charge Indicator.

A total MMS refrigerant charge is roughly proportional to a total volume filled with liquid refrigerant at any given point in time. Low system refrigerant charge occurs when the total system liquid volume drops. When the MMS 10 operates in the cooling mode, a total MMS refrigerant mass drops and the total MMS volume increases resulting in an overall increase in a volume of vapor refrigerant relative to a volume of liquid refrigerant. The overall increase in total MMS volume causes an increase in temperature of refrigerant exiting the indoor and outdoor heat exchangers 20 and 26 to a temperature above the boiling point of the refrigerant when the refrigerant is in a vapor state or a decrease in temperature of refrigerant exiting the indoor and outdoor heat exchangers 20 and 26 to a temperature below the boiling point of the refrigerant when the refrigerant is in a liquid state. These phenomena are known as superheat and sub-cool respectively. Under these conditions, the MMS 10 will tend to increase the vapor quality at those temperatures if saturated, thereby controlling the superheat.

In most systems, the superheat is controlled by actuating an expansion valve. An increase in superheat requires a greater opening of the expansion valve to allow an increased flow of refrigerant to pass through the indoor and outdoor heat exchangers 20 and 26 to maintain the desired superheat. In the example illustrated, the expansion valve 34 is a pulse modulated valve (PMV) and actuation pf the PMV is controlled via pulse modulation. As such, an increase in superheat translates into a higher pulse actuation which in turn correlates to low system refrigerant charge. In addition, low system refrigerant charge is also associated with lower system suction pressures.

While the present invention focuses on the cooling mode, the principles discussed are not limited to the cooling mode and may also extend to the heating mode.

The present invention includes a fault detection principal for identifying low system refrigerant charge which may be summarized as follows:

Low refrigerant charge indicator uses larger average PMV opening of the indoor units OR smaller values of suction pressure observed during the first few minutes (e.g. 10–20 minutes) after the compressor speed (rpm) exceeds a threshold (e.g. 40%–50% of its maximum rpm) excluding first 0–2 minutes of transient data.

This fault detection principle is the result of a systematic approach for identification of fault principles and decision rules for low refrigerant charge detection. This approach applies several statistical classification techniques to pre-processed field trial data as described below. The pre-processing involves application of a data filtering process whose objective is to zoom into parts of the data that carry most information about the fault event of interest.

The data filtering process decomposes a time-axis into time intervals during which "interesting" transient or steady state behavior occurs. Compressor speed (rpm), denoted by $v(t)$ at time t, is used as the base-signal for filtering. The base signal is the signal whose temporal behavior is used to decompose the time axis as explained more closely below.

The major step in the data filtering process is to decompose the time axis into a sequence of intervals $F=\{I_k\}$. This decomposition is a function of three filtering parameters $\kappa \geq 0, \Delta \geq 0, \bar{v} \geq 0$ i.e. $F=F(\kappa,\Delta,\bar{v})$ where $\bar{v}$ is a threshold value, $\kappa$ is a pre-determined time period during which an actual value measured by a sensor must remain above the threshold value $\bar{v}$ before a fault can be generated, and $\Delta$ defines a start-up time period during which the data collected is not considered. $F=\{I_k\}$ is constructed from another sequence $\{I'_k\}$. Each element, $I_k'$, is a closed time interval with the following three properties: (1) the length $I'_k$ is larger than or equal to $\kappa$, (2) $v(t) \geq \bar{v}$ for all t in $I'_k$, (3) $I'_k$ is the superset of all other overlapping closed intervals that possess the first two properties. Furthermore, $I'_k \cap I'_j = \emptyset$ for $k \neq j$. The sequence $\{I'_k\}$, k=1, 2, 3, . . . , is ordered in such a way that the supremum of all t belonging to $I'_k$, denoted by $e(I'_k)$, is smaller than the infimum of all t belonging to $I'_{k+1}$ denoted by $b(I'_{k+1})$. $\{I_k\}$ is constructed by letting $b(I_k)=b(I'_k)$ while $e(I_k)=\max(e(I'_k),b(I_k)+\Delta)$.

Figure 2:
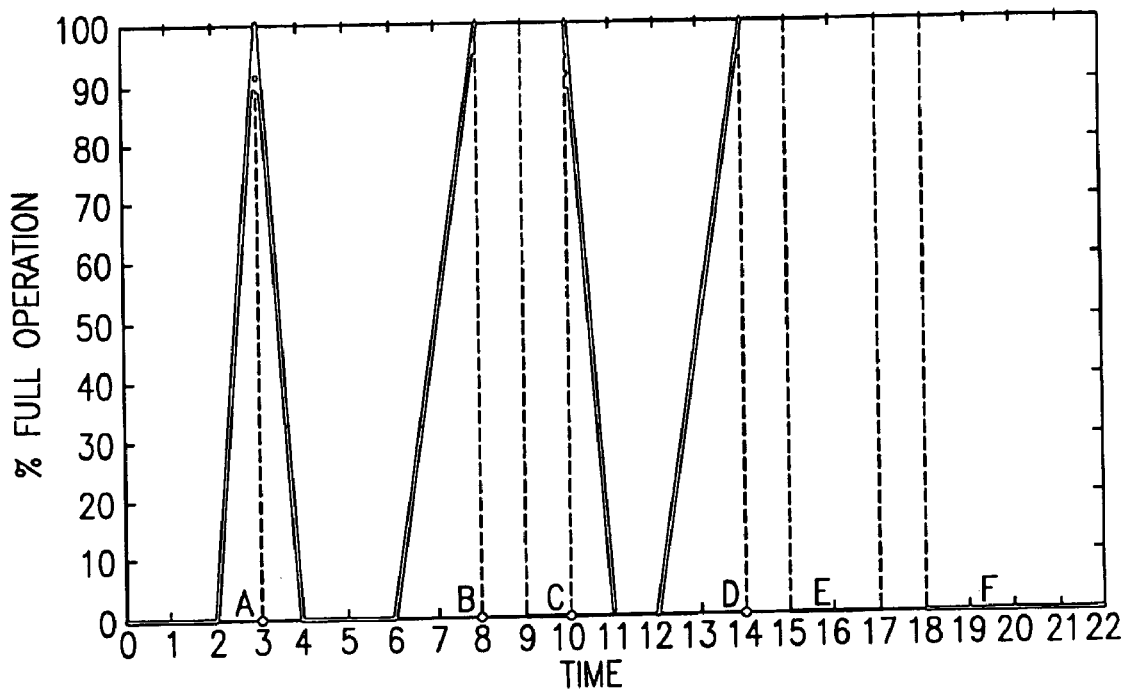
FIG. 2 is a graph illustrating how data filtering is used to zoom in on data depending on a transient response of a base signal.

As illustrated in FIG. 2, the following example illustrates show how data filtering can be used to zoom in data depending on a transient response of the base signal:

1. $HP(\Delta,\bar{v})=F(0,\Delta,\bar{v})$ where $\Delta$ is small to medium, constructs a high-pass filter. Points A, B, and D are segmented out by HP(0,100%).
2. $BP(\kappa,\Delta,\bar{v})=F(\kappa,\Delta,\bar{v})-F(\kappa,\kappa,\bar{v})$ where $\kappa$ is small to medium and $\Delta$ is medium to large, constructs a band-pass filter. Intervals C and E are segmented out by BP(1,2,100%).
3. $LP(\kappa,\bar{v})=BP(\kappa,\infty,\bar{v})=F(\kappa,\infty,\bar{v})-F(\kappa,\kappa,\bar{v})$ where $\kappa$ is medium, constructs a low-pass filter. An interval F is segmented out by LP(4,100%).

Also note that if the data in FIG. 2 is sampled with a sampling interval 1, then a union of intervals segmented by mutually exclusive sets HP(0,100%), BP(1,2,100%), and LP(4,100%) span all the data points for which the base signal is at 100% of its full operation range. For example, suppose the data are sampled at a sampling interval $\Delta T$. The union of the mutually exclusive sets $HP(i \times \Delta T,\bar{v})$, $BP((i+1) \times (\Delta T+1), j \times \Delta T, \bar{v})$, and $LP((i+j+2) \times \Delta T,\bar{v})$, where i, j are integers, spans all the data points for which the base signal is larger than or equal to $\bar{v}$. $\Phi$ is used to generically refer to a union of all time intervals picked by the filter.

To develop the fault detection principal, the time-axis is repeatedly decomposed into three disjoint sets of intervals characterized by high-pass, band-pass, and low-pass conditions using average speed of base compressors as the base signal and various filtering parameters. Each filtering results in a decomposition of time similar to the illustration in FIG. 2. For each repetition of the filtering process, the three disjointed data sets were analyzed based upon a set of statistical techniques consisting of sensor (variable) selection, calculation of distance between no-fault and full-fault data sets, and fault pattern discovery. The data filtering process resulted in selection of an opening associated with the PMV and a suction pressure as the variables carrying most information about system refrigerant charge leakage. An optimal filter was found to be $BP(\kappa,\Delta,\bar{v})$ with $\kappa \leq 2$, $10 \leq \Delta \leq 20$, and $\bar{v} \approx 50\%$ of full compressor speed. Combining these results led to the low system refrigerant charge fault detection principle stated above.

The fault detection principal for low system refrigerant charge is converted into an algorithm for low system refrigerant charge detection and implemented by calculating a low system refrigerant charge indicator over a batch of data of fixed length. The batch of data contains the most recent data points that have passed through the filter up to a point determined by its fixed length. As more data points become available, they replace the oldest data points, keeping the length of the data batch fixed.

To illustrate, consider FIG. 2 again. Suppose that the filter used in the calculations is BP(1,2,100%), segmenting intervals C and E. Also suppose that the sampling time is 1 and the fixed data length is 3. The batches of data in chronological order for this example will be {9,10,15}, {10,15,16}, and {15,16,17}. A time calculated as an average (or median) time of the batches member points is assigned to each data batch. In this example, the times associated with {9,10,15}, {10,15,16}, and {15,16,17} will be 11.3, 13.7, and 16 respectively using averaging over the time points in the batch. A low system charge indicator within each batch is calculated by finding the fraction of points within the batch for which the PMV opening is above a threshold or the suction pressure is below a threshold. The calculated low system charge indicator is assigned to the time associated with the batch.

Figure 3:
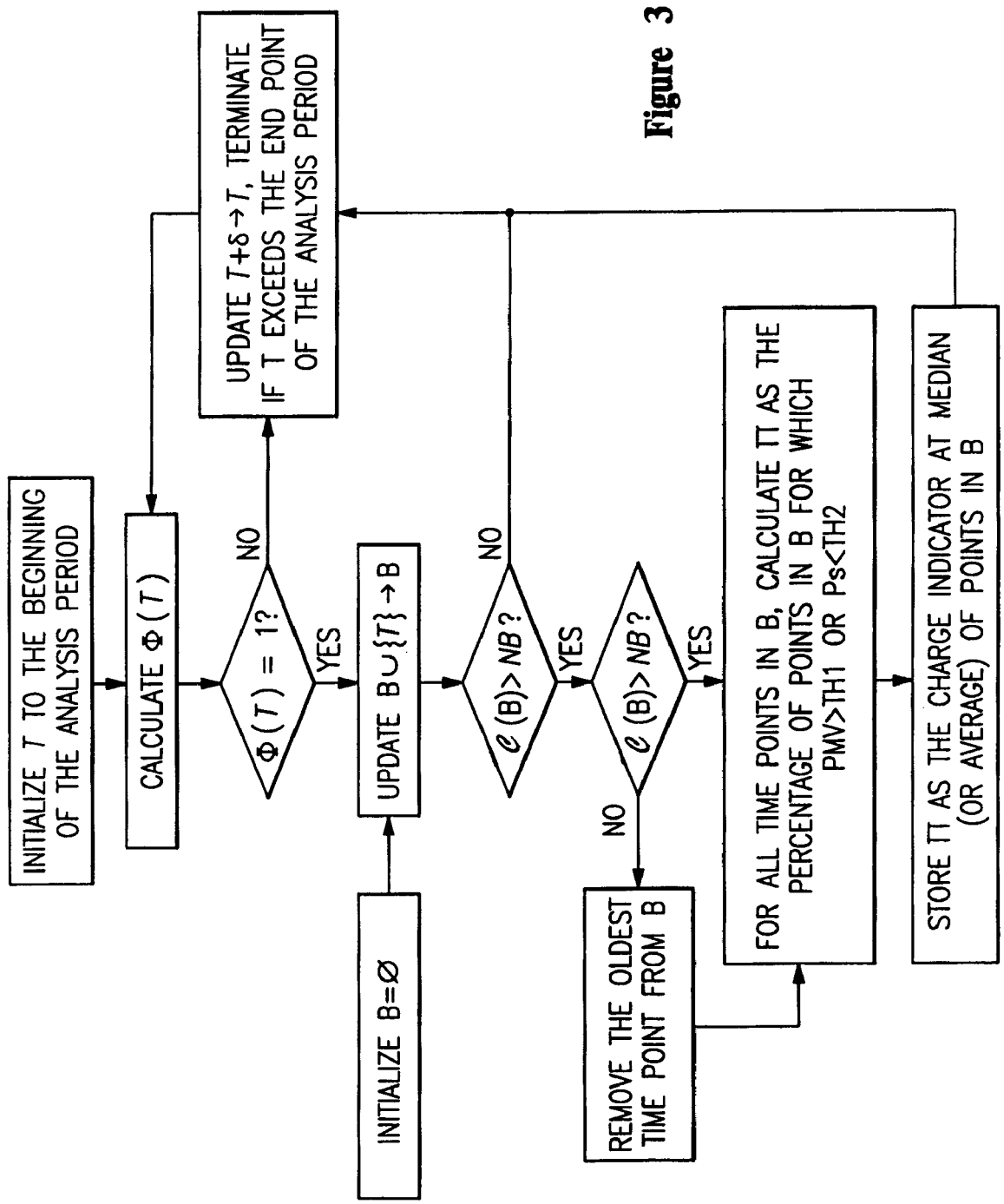
FIG. 3 is a flow chart detailing an example charge leakage calculation.

FIG. 3 is a flow chart detailing an example charge leakage calculation. In this flow chart:

$\Phi(t)$ is a binary indicator that assumes one or zero. $\Phi(t)$ is equal to one only if t belongs to an analysis period of interest, a set of all intervals picked by the designed filter, and under a cooling mode operating condition (excluding compressor protection conditions).

A batch of data, B, always keeps the most recent time points for which $\Phi(t)=1$. A fixed number of points NB in the batch are set by a user. Typical values for the MMS application are 24×60 or 12×60.

C(B) denotes a number of elements of B.

$\delta$ represents a sampling time. $\delta$ should be larger than the data collection sampling time (in MMS case 1 minute), but may be selected larger to accelerate computations.

Development of an Air Filter Plugging Indicator.

An air filter plugging algorithm uses simple physical relations to estimate a mass flow of air through each heat exchanger. Due to lack of sufficient airside measurements, these relations are based on several simplifying assumptions as described below:

Log-mean temperature and energy balance equations are applied to estimate the mass flow of air in the heat exchanger.

The mass flow of air is inversely proportional to air filter resistance.

A portion of the heat exchanger where refrigerant superheats has large UA.

Refrigerant flow is proportional to an opening associated with the PMV.

Air latent cooling is negligible.

Based on these assumptions, the inverse of air mass flow in each heat exchanger is estimated via:

$$F = \frac{(T_a - Tc_j)}{PMV(Tc_1 - Tc_j)}$$

As illustrated in FIG. 1, $T_a$ is an indoor air temperature, $Tc_j$ is a middle of an indoor coil temperature (measuring a saturation temperature of the refrigerant in the heat exchanger), $Tc_1$ is a temperature of the superheated refrigerant flowing out of the indoor unit heat exchangers 26, and PMV is an actuation signal of the pulse modulated expansion valves 34A and 34B.

In FIG. 1, the measurement points $T_a$, $Tc_1$, $Tc_j$ are respectively marked/numbered by TA-A, TC1-A, and 11 for indoor unit 14A and TA-B, TC1-B, and 13 for indoor unit 14B.

Because these assumptions ignore several sources of variability such as latent cooling, an analysis is performed over longer periods to "average out" possible unknown effects. Similar to the development of the low system refrigerant charge indicator discussed above, batches of data are processed for calculation of the air filter plugging indicator. From this point of view, the algorithm is identical to the calculation of the low system refrigerant charge indicator for data batches of certain size.

Because the air filter plugging algorithm estimates the inverse of air mass flow in each indoor heat exchanger 26 while the indoor fan 28 runs at various speeds, it is recommended that calculation of the air filter plugging indicator and its comparison to a threshold be performed for each fan speed separately. Although the fan speed data is not directly available, a set-point for the speed (FANTAP) is available and may be used as a proxy for the fan speed.

The data filtering process for calculation of the air filter plugging indicator is much simpler than the data filtering process for low system refrigerant charge indicator calculation. The calculation of the air filter plugging indicator involves capturing sensor data that satisfies basic regularity principles needed for application of log mean temperature and energy balance in the cooling mode operations. The filter $\Phi$ is set to one at each time point if $T_a > Tc_j$, $Tc_1 > Tc_j$, PMV larger than a threshold (a value of about 100 is appropriate), and FANTAP is equal to a mode for which the calculation is performed.

Figure 4:
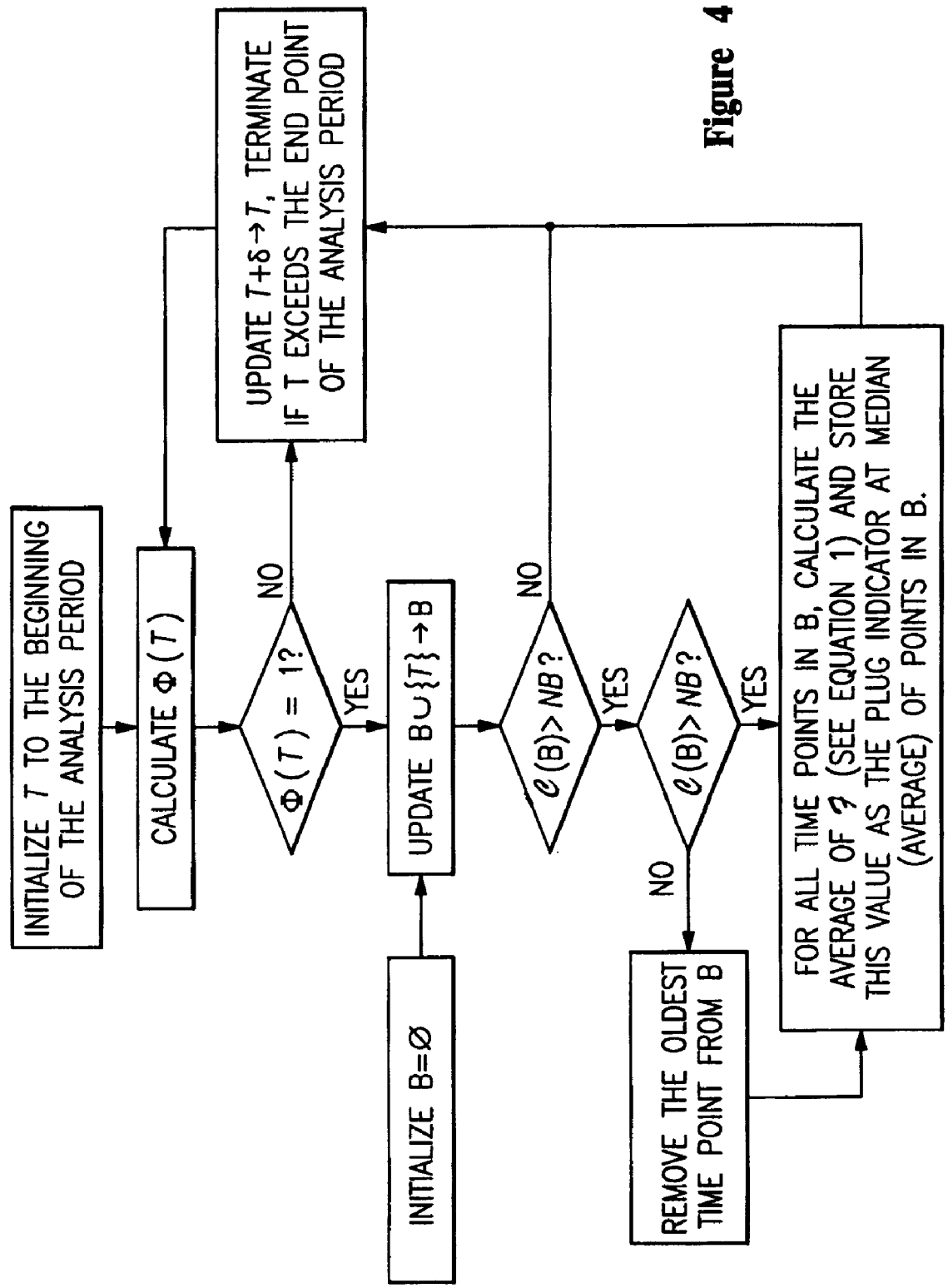
FIG. 4 is a flow chart detailing an example air filter plugging calculation.

FIG. 4 is a flow chart detailing an example air filter plugging calculation. In this flow chart:

$\Phi(t)$ is a binary indicator that assumes one or zero. $\Phi(t)$ is equal to one only if t belongs to an analysis period of interest, a set of all intervals picked by the designed filter, and under a cooling mode operating condition (excluding compressor protection conditions).

A batch of data, B, always keeps the most recent time points for which $\Phi(t)=1$. A fixed number of points NB in the batch are set by a user. Typical values for the MMS application are 24×60 or 12×60.

C(B) denotes a number of elements of B.

$\delta$ represents a sampling time. $\delta$ should be larger than the data collection sampling time (in MMS case 1 minute), but may be selected larger to accelerate computations.

Figure 5:
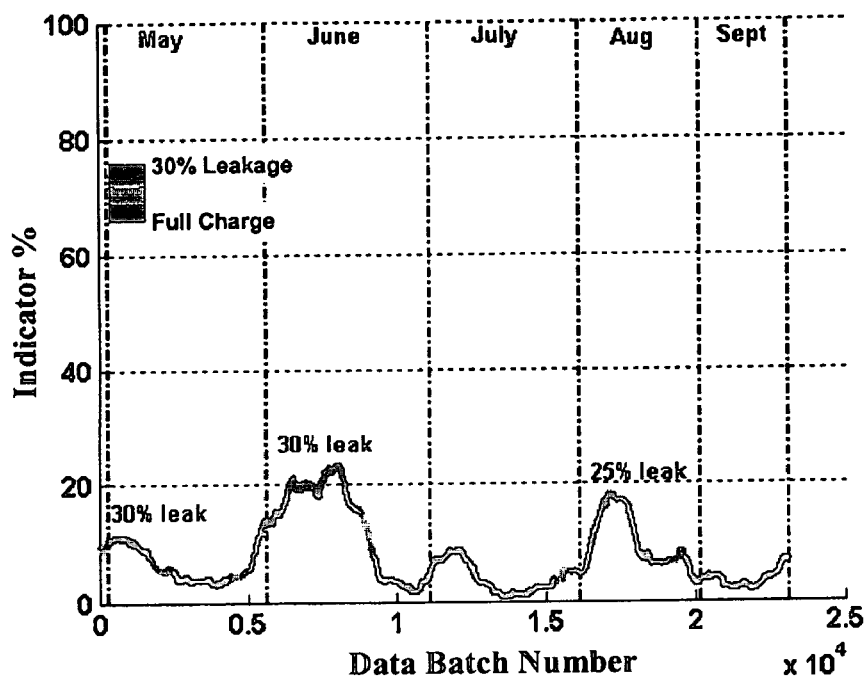
FIG. 5 illustrates an algorithm response to induced low system refrigerant charge conditions for a first example MMS system.
Figure 6:
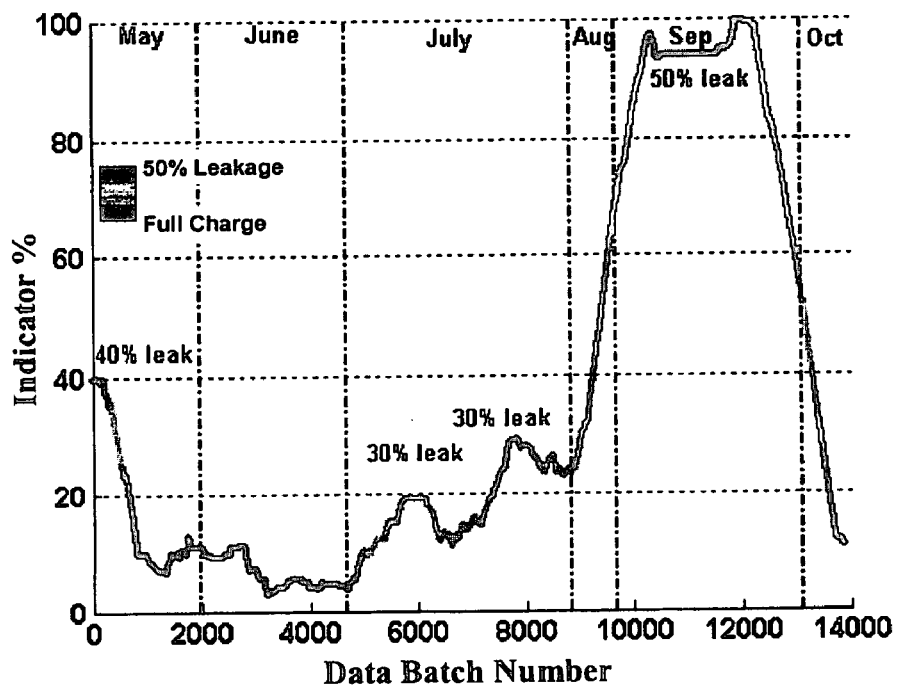
FIG. 6 illustrates an algorithm response to induced low system refrigerant charge conditions for a second example MMS system.

FIG. 5 and FIG. 6 show an algorithm response to induced low system refrigerant charge conditions for a first example MMS and a second example MMS respectively. Both example MMS's include one outdoor unit and five indoor units which were designed to meet the cooling and heating demands of two office rooms and two conference rooms. In calculating the results, the thresholds that were optimized for the first system were directly applied to a data set of the second system without any further tuning. In other words, the first system data set was used for "algorithm training" while the second system data was used for validation.

In regard to the low system refrigerant charge, the plots illustrated in FIG. 5 and FIG. 6 show the value of a low system refrigerant charge indicator as a function of the number of data batches processed by the algorithm. The data batches are ordered chronologically. The low system refrigerant charge indicator for each batch of data is calculated by finding a percentage of points within the batch for which an opening associated with the PMV is larger than a pre-determined threshold or a suction pressure is smaller than a pre-determined threshold. The variation in intensity of the plot line represents an actual charge averaged over all the points in the batch of data. For instance, if 40% of the points within the batch have 30% charge loss while the rest have full charge (0% charge loss), the average actual charge loss for that batch of data will be 12%, which is referred to as an average actual fault (AAF). From this plot, one may deduce that a value of indicator above 10–15% would flag low charge condition (>25% AAF).

Figure 7:
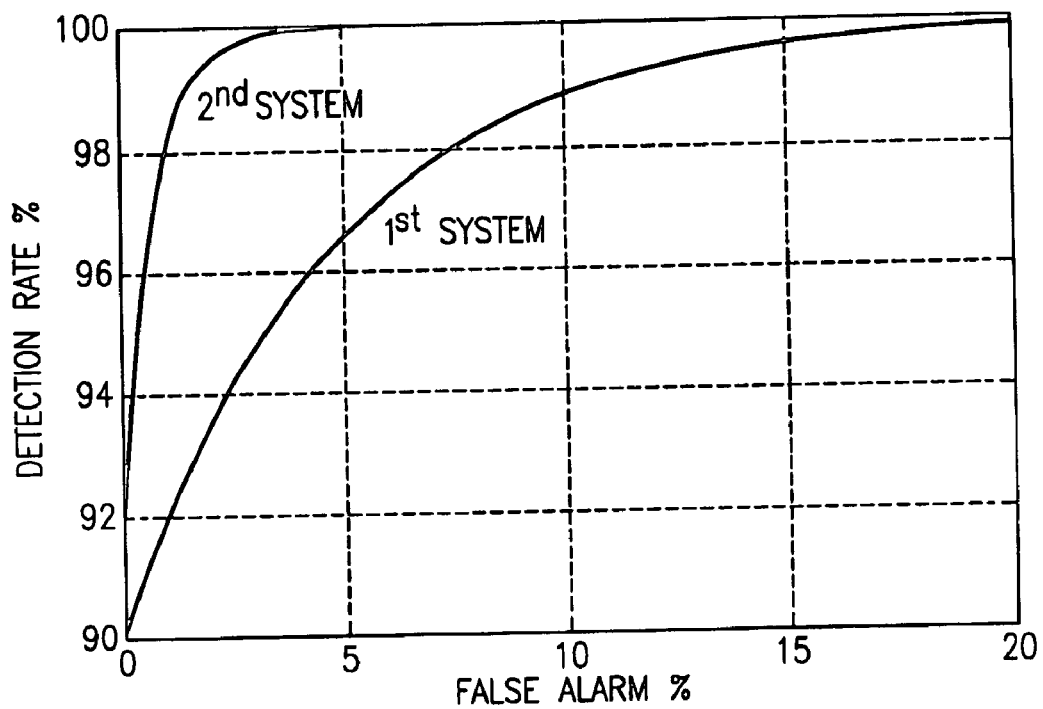
FIG. 7 is a graph illustrating a receiver operating characteristic (ROC) for a low charge detection algorithm.

FIG. 7 plots a receiver operating characteristic (ROC) of the low system refrigerant charge detection algorithm. ROC is a widely used tool for assessment of the performance of detection algorithms independent from a detection threshold. ROC plots detection rate (hit rate) of an algorithm as a function false alarms (false positives) generated by the algorithm. Detection rate or hit rate measures the probability of the low system refrigerant charge indicator raising an alarm given a failure event actually happens. False alarm or false positive measures the probability of indicating a failure when no failure is actually present. An ideal ROC curve will have 100% detection rate for any positive false alarm.

Conceptually, ROC may be calculated by changing the detection threshold from its minimum to its maximum possible value, calculating a false alarm-detection rate pair for each chosen detection threshold, and plotting the calculated pairs. In other words, each point on the ROC curve is associated with one threshold value. When generating the ROC in FIG. 7, presence of a faulty condition for a batch of data is defined as AAF>15% for that data batch. The absence of a fault for the data batch is defined as AAF<5%.

Figure 8:
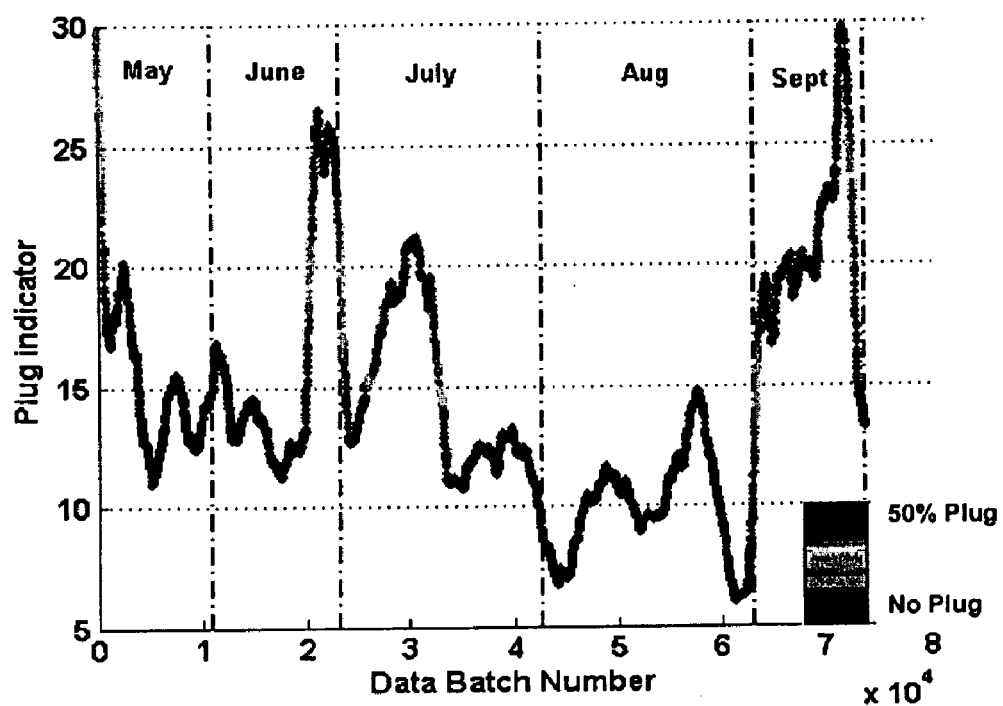
FIG. 8 illustrates an algorithm response to induced air filter plugging conditions for a high wall MMS system.
Figure 9:
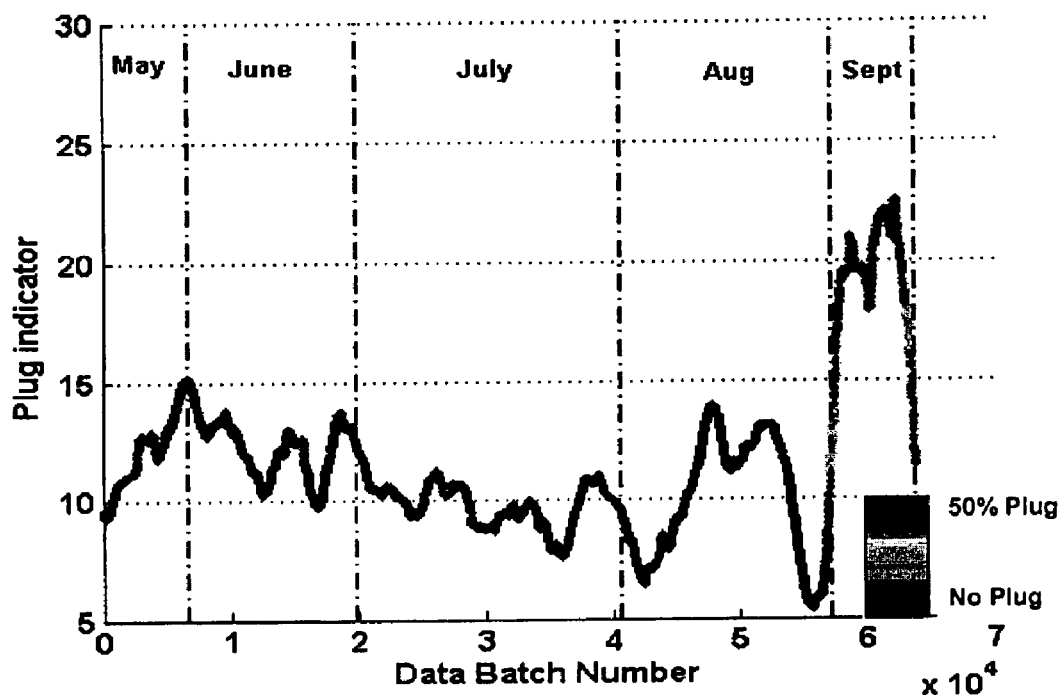
FIG. 9 illustrates an algorithm response to induced air filter plugging conditions for a 4-way MMS system.

FIG. 8 and FIG. 9 show an algorithm response to induced air filter plugging at a high wall unit and a 4-way unit respectively. The presented results are based on data collected from a first system at a high fan speed. The plots show a value of an air filter plugging indicator as a function of a number of data batches processed by the algorithm (ordered chronologically). A variation in intensity of the plot line represent the actual average fault (AAF), defined similarly above. For instance, if 40% of the points within the batch have 50% plugging while the rest have no plugging (0% plugging), the AAF for that batch will be 20%. From this plot, one may deduce that a value of the air filter plugging indicator above 15 would flag plugging conditions.

Figure 10:
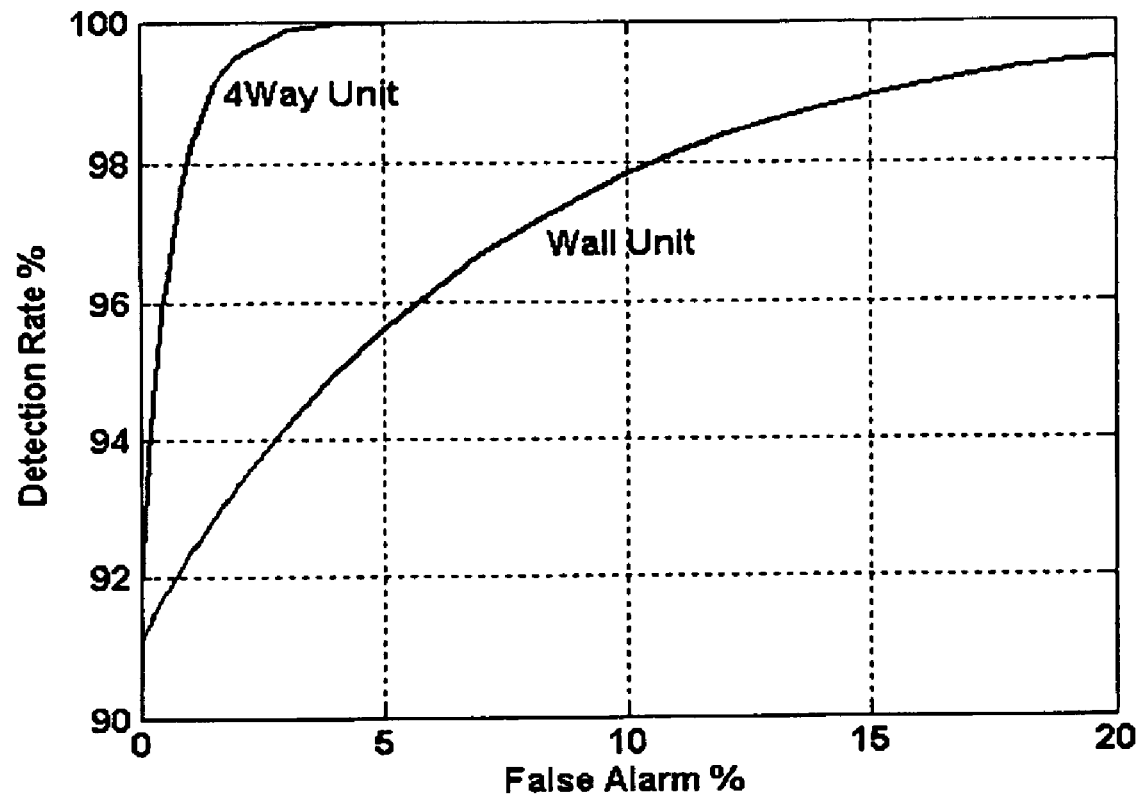
FIG. 10 is a graph illustrating a ROC for an air filter plugging detection algorithm.

FIG. 10 plots a ROC for the air filter plugging detection algorithm. When generating the ROC in FIG. 10, presence of a faulty condition for a batch of data is defined as AAF>25%. The absence of fault for the data batch is defined as AAF<5%.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A method of diagnosing at least one system fault comprising the steps of:
   (a) identifying sensors available within a system, wherein identified sensors generate sensor data relating to system operating characteristics;
   (b) analyzing the sensor data to identify patterns indicative of at least one failure mode, wherein the sensor data is analyzed under a full-fault condition and under a no-fault condition;
   (c) determining a fault relationship based upon identified patterns;
   (d) comparing at least one system operating characteristic to the fault relationship to identify a system fault; and
   (e) generating at least one fault code indicative of the at least one failure mode when a system fault is identified in step (d).

2. The method of diagnosing at least one system fault as recited in claim 1, wherein step (b) further includes the steps of:
   (f) generating a full-fault data set under the full-fault condition and a no-fault data set under the no-fault condition from each of the identified sensors;
   (g) comparing the full-fault data set from each of the identified sensors with the no-fault data set from the same identified sensor,
   (h) identifying a maximum separation between the full-fault data set and the no-fault data set for each identified sensor;
   (i) selecting the identified sensor associated with a greatest maximum separation between the full-fault data set and the no-fault data set associated with the identified sensor; and
   (j) identifying the at least one system characteristic of step (d) based upon the selected identified sensor of step (i).

3. The method of diagnosing at least one system fault as recited in claim 1, wherein step (c) further includes the steps of:
   (k) determining a threshold value associated with the at least one system characteristic;
   (l) monitoring an actual value associated with the at least one system characteristic; and
   wherein step (e) further includes generating the at least one fault code based upon a comparison of the actual value and the threshold value.

4. The method of diagnosing at least one system fault as recited in claim 3, wherein step (k) further includes the steps of:
   (m) calculating a distance between the full-fault data set and the no-fault data set for the selected identified sensor associated with the maximum separation; and
   (n) maximizing the distance based upon filtering parameters and variable sub-selection.

5. The method of diagnosing at least one system fault as recited in claim 3, wherein step (e) further includes the step of:
   (o) identifying at least one other system characteristic not monitored by any of the identified sensors, wherein at least one other system characteristic is indicative of the at least one system failure mode associated with the at least one fault code.

6. The method of diagnosing at least one system fault as recited in claim 5, wherein step (e) further includes the steps of:
   (p) calculating an avenge value associated the at least one other system characteristic for a given sampling time; and
   (q) monitoring an actual value associated with the at least one other system characteristic.

7. The method of diagnosing at least one system fault as recited in claim 6, wherein step (e) further includes generating the at least one fault code when the actual value associated with the at least one system characteristic exceeds the threshold value and the actual value associated with the at least one other system characteristic exceeds the average value.

8. The method of diagnosing at least one system fault as recited in claim 7, wherein the at least one system characteristic is associated with a degree of actuation of at least one control valve within with the system.

9. The method of diagnosing at least one system fault as recited in claim 6, wherein step (e) further includes generating the at least one fault code when the actual value associated with the at least one system characteristic falls below the threshold value and the actual value associated with the at least one other system characteristic exceeds the avenge value.

10. The method of diagnosing at least one system fault as recited in claim 9, wherein the at least one system characteristic is a suction pressure associated with a compressor.

11. The method of diagnosing at least one system fault as recited in claim 1, wherein step (c) further includes the steps of:
    (r) analyzing the identified patterns; and
    (s) combining the idernified patterns with available physical system information to determine the fault relationship.

12. The method of diagnosing at least one system fault as recited in claim 1, further ineJuding the steps of:
    (t) determining a threshold value associated with the at least one system operation characteristic of step (d);
    (u) estimating a second system operating characteristic; and
    (v) measuring a third system operating characteristic, wherein the threshold value and the second system operating characteristic are calculated and estimated respectively based upon the third system operating characteristic.

13. The method of diagnosing at least one system fault as recited in claim 12, wherein the second system operating characteristic is indicative of the at least one system failure mode associated with the at least one fault code.

14. The method of diagnosing at least one system fault as recited in claim 13 wherein step (e) further includes the step of:
    (v) calculating an avenge value associated with the second system operating characteristic for a given sampling time; and
    (w) monitoring an actual value of the second system operating characteristic.

15. The method of diagnosing at least one system fault as recited in claim 14, wherein step (e) further includes generating the at least one fault code when the actual value associated with the at least one system operating characteristic exceeds the threshold value and the actual value of the second system operating characteristic exceeds the average value.

16. The method of diagnosing as least one system fault as recited in claim 1, wherein the system is a vapor compression system.

17. The method of diagnosing as least one system fault as recited in claim 16, wherein the identified sensors in the vapor compression system include at least one pressure sensor, at least one temperature sensor, and at least one valve sensor.

18. A vapor compression system comprising:
  at least one indoor unit including at least one indoor sensor and at least one indoor valve;
  at least one outdoor unit in communication with the at least one indoor unit and including at least one outdoor sensor and at least one outdoor valve;
    a control device for controlling the at least one indoor unit and the at least one outdoor unit, wherein the control device further includes:
  a controller that collects and interprets data from the at least one indoor sensor and the at least one outdoor sensor and generates at least one fault code based on the data, wherein the at least one fault code is generated based upon analysis of the data under a full-fault condition and under a no-fault condition.

19. The system of claim 18, wherein the controller combines the data with available system information from the at least one indoor unit and the at least one outdoor unit to generate the at least one fault code.

20. The system of claim 18, wherein the controller receives a plurality of data inputs associated with a plurality of system operating characteristics, calculates an indicator based upon the plurality of system operating charactedstics, and generates the at least one fault code based upon a comparison of the indicator to a threshold.

* * * * *

UNITED STATES PATENT AND TRADEMARK OFFICE
CERTIFICATE OF CORRECTION

| | | |
|---|---|---|
| PATENT NO. | : 7,188,482 B2 | |
| APPLICATION NO. | : 11/192595 | |
| DATED | : March 13, 2007 | |
| INVENTOR(S) | : Sadegh et al. | |

It is certified that error appears in the above-identified patent and that said Letters Patent is hereby corrected as shown below:

Claim 6, Column 10, line 4: "avenge" should be --average--

Claim 9, Column 10, line 26: "avenge" should be --average--

Claim 11, Column 10, line 34: "idernified" should be --identified--

Claim 12, Column 10, line 38: "ineJuding" should be --including--

Claim 14, Column 10, line 56: "avenge" should be --average--

Claim 20, Column 12, line 14: "charactedstics" should be --characteristics--

Signed and Sealed this

Fifteenth Day of May, 2007

JON W. DUDAS
*Director of the United States Patent and Trademark Office*